US005784141A

United States Patent [19]
Chen et al.

[11] Patent Number: 5,784,141
[45] Date of Patent: Jul. 21, 1998

[54] BI-STABLE NON-PIXELLATED PHASE SPATIAL LIGHT MODULATOR FOR ENHANCED DISPLAY RESOLUTION AND METHOD OF FABRICATION

[75] Inventors: Diana Chen, Gilbert; Phil Wright, Scottsdale; Cheng-Ping Wei, Gilbert, all of Ariz.

[73] Assignee: Motorola, Inc., Schaumburg, Ill.

[21] Appl. No.: 726,005

[22] Filed: Oct. 4, 1996

[51] Int. Cl.⁶ .................................................. G02F 1/139
[52] U.S. Cl. .......................... 349/191; 349/163; 349/202
[58] Field of Search ................................. 349/124, 163, 349/125, 191, 126, 128, 129, 201, 202; 430/20; 359/279, 298, 569, 573

[56] References Cited

U.S. PATENT DOCUMENTS

4,878,742  11/1989  Ohkubo et al. .................... 349/128
5,528,401   6/1996  Narutaki et al. ................... 349/124
5,576,870  11/1996  Ohmae ............................... 349/201
5,638,201   6/1997  Bos et al. .......................... 349/128

*Primary Examiner*—William L. Sikes
*Assistant Examiner*—Tai V. Duong
*Attorney, Agent, or Firm*—Eugene A. Parsons

[57] ABSTRACT

A phase spatial light modulator composed of a liquid crystal cell having molecular orientation recorded during the fabrication process as a direct result of a photochemical reaction exerted upon the liquid crystal material, a mechanically-induced change of a liquid crystal alignment layer, or by varying a plurality of polymer materials that compose the liquid crystal alignment layer, thereby affecting the liquid crystal material contained within the cell. The modulator, or scanner, thereby capable of altering the phase, thus steering light passing therethrough. During operation, the liquid crystal molecules deflect the light beam passing therethrough based on their orientation as recorded during fabrication when the applied voltage is "OFF" or in an altered state when the applied voltage is "ON".

5 Claims, 5 Drawing Sheets

BI-STABLE NON-PIXELLATED PHASE SPATIAL LIGHT MODULATOR FOR ENHANCED DISPLAY RESOLUTION AND METHOD OF FABRICATION

FIELD OF THE INVENTION

The present invention pertains to the field of optical scanners, or beam steerers and the method of fabrication of such devices, and more particularly to the modulation of light resulting in the enhanced display resolution of a visual image.

BACKGROUND OF THE INVENTION

The human visual system is a complex system with a great ability to absorb vast amounts of information originating in many varying formats, including visual displays. Visual displays are found in varying sizes and forms in today's world, displaying many types of information, from large visual display screens announcing scheduling information found in airports, to small visual displays, such as those incorporated into pocket calculators. Of concern in the reduction in the size of visual displays, specifically those utilized in portable electronic devices, such as portable communications equipment, or the like, is the display resolution quality and the maintenance of minimal power requirements, simple drive circuitry and low manufacturing costs.

One alternative method of fabricating a miniature visual display is to utilize scanning techniques to create an integrated image generated from an image source having a minimal number of pixels. Of relevance in the reduction in size of visual displays utilizing scanning techniques, and the maintenance of resolution quality, is the human visual system's ability to process and integrate information, and the speed at which the visual system is able to do so. The human visual system can process information no faster than approximately 60 Hz. Therefore, an image that is projected and scanned within 1/60th of a second to varying positions within a visual display is seen by the eyes of the viewer as one enlarged integrated image. As an example, by moving an image of an "A" to six different locations within a visual display, at a frequency of 60 Hz, the viewer will see one integrated image composed of six "A"s. If the image is simultaneously content modulated, for example, the images are of six letters "A", "B", "C", "D", "E" and "F" that are individually and sequentially moved to six varying positions at a speed of 60 Hz., the viewer will see one integrated image composed of the six letters. This process, more commonly known as time-multiplexed imagery, can be utilized in the field of display technology through the use of scanners or beam steerers, and more specifically in the development of enhanced resolution miniature visual displays.

Scanning, or beam steering, devices utilized today aid in increasing the resolution of visual displays. These scanning devices can be found in many forms, most commonly electro-mechanical scanners incorporating mirrors, such as galvanometric scanners and polygonal scanners. These types of electro-mechanical scanners are commonly quite large in size, therefore not amenable to the incorporation into a display device that is small, lightweight, operates with low power consumption and is meant to be portable in nature. In addition, mechanical scanners are complex and thus expensive to manufacture and in many instances utilize great amounts of power during operation.

Recent invention has brought about new scanning devices that are capable of being fabricated small enough in size and power requirements so as to be incorporated into portable products, such as pixellated miniature liquid crystal phase spatial light modulators.

This type of scanning device generally requires the use of a large number of interconnects to drive the device and achieve the desired number of phase changes. For instance, during operation varying voltages are required to be exerted upon specific areas of a liquid crystal cell dependent upon the phase shift required for that particular area of the cell. The result is a very complex drive circuitry where the required scanning angle is large or the scanning aperture is large. In addition, because of the large number of interconnects, manufacturing costs are increased.

Thus, there is a need for a small non-pixellated liquid crystal phase spatial light modulator scanning device capable of operating in two stable operating states, as a result of input signals, that allows for the steering, or scanning, of light passing therethrough in response to phase information recorded during fabrication, requiring simple drive circuitry to operate the device.

Accordingly, it is highly desirable to provide for a scanning device, that utilizes a liquid crystal phase spatial light modulator for phase modulation, in which phase gratings can be recorded in the scanning device during fabrication, thereby providing for the scanning of light passing therethrough in response to input signals.

It is a purpose of the present invention to provide a new and improved liquid crystal phase spatial light modulator for display resolution enhancement that is capable of spatially modulating light passing therethrough.

It is a still further purpose of the present invention to provide for a scanning device that is capable of directionally deflecting a beam of light passing therethrough dependent upon the state of operation of the device, more specifically due to "ON/OFF" input signals received by the device, thereby affecting recorded molecular alignment of the liquid crystal material.

It is a further purpose of the present invention to provide a liquid crystal phase spatial light modulator incorporated into a new and improved visual display system for display resolution enhancement, thereby allowing for the incorporation of the scanner into miniature visual displays.

SUMMARY OF THE INVENTION

The above problems and others are substantially solved and the above purposes and others are realized in a bi-stable non-pixellated liquid crystal phase spatial light modulator that is capable of operating in two discrete states in response to an external stimulus applied to the modulator, thereby providing for one of a straight passage and an optical deflection, of a light beam passing therethrough dependent upon the state of operation.

In general, the bi-stable non-pixellated liquid crystal phase spatial light modulator of the present invention, hereinafter referred to as the liquid crystal scanner, serves to spatially modulate or steer the phase of the light emitted by the image source, thus the directional path of the light passing therethrough. This is accomplished based on the principle that the structural organization of the molecules, which compose the liquid crystal material of the liquid crystal cell, is not rigid, meaning that the molecules can be easily reoriented and recorded during fabrication of the liquid crystal cell as a direct result of a photo-chemical reaction exerted upon the liquid crystal material or a mechanically-induced change of a liquid crystal alignment layer or use of varying polymer materials which form the alignment layer, thereby affecting the liquid crystal material. As a result the liquid crystal molecules are capable of deflecting the light beam passing therethrough based on their orientation as recorded during fabrication when the applied voltage is "OFF" or in an altered state when the applied voltage is "ON". The exertion of an external stimulus on the liquid crystal material results in the reorientation of the recorded molecular structure of the liquid crystal material, thereby causing the light passing therethrough to pass straight through without undergoing a change in phase. Simply stated, the phase change is a function of the previously induced molecular alignment of the liquid crystal material absent the influence of the external stimulus, or in the present invention, the voltage applied.

BRIEF DESCRIPTION OF THE DRAWINGS

The novel features believed characteristic of the invention are set forth in the claims. The invention itself, however, as well as other features and advantages thereof will be best understood by reference to detailed descriptions which follow, when read in conjunction with the accompanying drawings, wherein:

DETAILED DESCRIPTION OF THE PREFERRED EMBODIMENT

The present invention is based on utilizing individually addressable visible light emitting devices formed in an array, that in combination with driver/control circuitry and optical elements compose a light emitting display device, or image source, of the present invention. To increase the resolution for a given number of light emitting devices or to reduce the number of light emitting devices needed to achieve a desired resolution, scanning techniques utilizing a bi-stable non-pixellated liquid crystal phase spatial light modulator, hereinafter also referred to as a liquid crystal scanner, are employed. The light emitting display device serves as the image source for a visual display system whereby a resulting integrated image is formed by scanning portions or elements of the array of light emitting devices, through the liquid crystal scanner, thereby spatially modulating the phase of the light emitted by that portion. This phase modulation serves to change the directional travel and in essence "moves" the light to another portion of the display. More particularly, the scanner allows for a straight passage or an optical deflection of the light beam passing therethrough dependent upon the mode of operation. This scanning action forms what appears to the observer to be a high resolution resultant integrated image. Those skilled in the art will appreciate that scanning allows a full page display to be created from a much smaller number of display devices than is necessary to generate the full page display. The resultant integrated image is viewable as one of a direct view image, a miniature virtual image, or a projected image.

The scanning process utilized in the present invention is based on the principle of spatial phase modulation, thereby altering the directional path of light emitted by portions or elements of the array of light emitting devices. Of concern in the fabrication of a resultant integrated image utilizing scanning techniques, is the number of interconnects and complexity of the drive circuitry, thus the manufacturing costs.

In the preferred embodiment of the liquid crystal scanner of the present invention the device is capable of scanning or steering linearly polarized light, therefore unpolarized light emitted by the image source must be changed to linearly polarized light before it will be effectively modulated by the liquid crystal scanner. Alternatively, the liquid crystal scanner is composed of at least two liquid crystal cells, aligned having perpendicular extraordinary optical axis. By aligning the cells in this manner, so as to have the extraordinary optical axis perpendicular to one another, and by recording separate but equal information across both liquid crystal cells, substantially all of the emitted light undergoes a phase modulation. Alternatively stated, the cells are aligned so that the molecular alignment of the two cells is orthogonal to each other. As a result, unpolarized light entering the first cell undergoes a first phase modulation prior to entering the second cell and undergoing a second phase modulation. The phase modulation of the light passing therethrough allows for all light to be steered into a chosen directional path.

In a preferred embodiment, the bi-stable non-pixellated liquid crystal phase spatial light modulator is composed of at least one liquid crystal cell having no defined pixels and containing recorded molecular orientation. It should be understood that any number of liquid crystal cells can be linearly aligned to form the scanner of the present invention. Light entering the liquid crystal scanner device undergoes a phase modulation dependent upon the recorded phase information, i.e. the recorded molecular orientation. At the time in which an external stimulus is applied, the molecular orientation of the liquid crystal material is altered, resulting in the absence of phase modulation of the light passing therethrough. Instead of utilizing defined pixels, the scanner of the present invention utilizes specific recorded information at predetermined intervals within the cell. The resulting phase modulation allows for the image source, having minimal pixel numbers and low fill factor, in combination with the liquid crystal scanner composed of at least one liquid crystal cell having recorded information, or molecular alignment, fabricated as a part thereof, to generate an integrated image by modulating the phase of light emitted therethrough in response to the presence or lack of voltage exerted thereupon. The resultant image appears to be composed of a much greater number of pixels, thus enhanced display resolution.

As previously stated, the purpose of this disclosure is to provide for a bi-stable, non-pixellated liquid crystal scanner and method of fabrication, that can be utilized in a miniature visual display system, composed of a light emitting display device, the scanner, driver/control circuitry, and a plurality of optical elements. In the preferred embodiment, the use of the miniature liquid crystal scanner to bring about the phase modulation of the light emitted by a display device, allows for the display system to remain small in size and permits it to be incorporated into miniature visual displays such as those found in portable electronics equipment, or the like. It should be understood that various sources of light or image generating devices can be utilized such as inorganic or organic light emitting diodes (LEDs), vertical cavity surface emitting lasers (VCSELs), cathode ray tubes (CRTs), field emission displays (FEDs), electroluminescent displays, plasma displays, liquid crystal displays (LCDs), etc., which may be formed in a two-dimensional array. It should also be understood that when utilizing these alternative light or image sources, that additional filters and/or optical elements may be required in addition to those described for the preferred embodiment. The general term "light emitting devices" will be utilized throughout this disclosure for the sake of simplicity. It should further be understood that the bi-stable non-pixellated liquid crystal phase spatial light modulator and method of fabrication as disclosed is additionally anticipated to aid in scanning or beam steering in other electro-optical devices, such as target tracking devices, weaponry, optical communications devices, printing devices, image scanning devices or the like.

Referring now to the accompanying illustrations, disclosed is the bi-stable non-pixellated liquid crystal modulator, or scanner, device of the present invention, fabricated according to various disclosed methods. It should be understood that the preferred embodiment of the liquid crystal scanner of the present invention is generally composed of a plurality of liquid crystal cells linearly aligned end to end, although alternative embodiments may contain at least two liquid crystal cells as previously disclosed, separate or integrally formed, aligned one on top of another.

The specific methods of fabrication which may be utilized in the formation of the scanner of the present invention as well as the structure itself, are described with regard to FIGS. 1–4 and 7–10, illustrating in simplified partial cross-sectional views the various steps according to the disclosed methods of fabrication. Referring now to FIGS. 1–4, illustrated in schematic sectional views are steps in the method of fabrication of the bi-stable non-pixellated liquid crystal scanner according to a first disclosed method, more particularly fabrication utilizing a mechanically-induced fabrication of an alignment layer employing evaporative techniques to achieve altered liquid crystal molecular alignment, or chemically-induced fabrication employing evaporative techniques that utilize various alignment materials, more specifically various polymers.

Referring specifically to FIGS. 1–6, a simplified and enlarged partial sectional view of a transmissive liquid crystal device 30 generally fabricated in a stack formation including two substrates 10 formed of any convenient optically transparent material, such as glass. A conductive material layer 12 is formed on an upper surface of each substrate 10. Electrically conductive material layer 12 is fabricated of an optically transparent material, such as indium tin oxide (ITO), thereby allowing the light impinging thereon to pass therethrough and defining an optically clear contact. A molecular liquid crystal alignment, or orientation, layer 14 is positioned on a surface of each of the transparent electrically conductive material layers 12. Alignment layers 14 serve to properly position and align the molecules comprising the liquid crystal material (discussed presently), so as to orient the molecules in a specific direction when there does not exist any external stimulus, such as a voltage, acting upon the liquid crystal device 30. It should be understood that while two separate alignment layers 14 are disclosed in this transmissive liquid crystal cell fabrication, alternative fabrication utilizing only one single alignment layer is anticipated by this disclosure.

Figure 1:
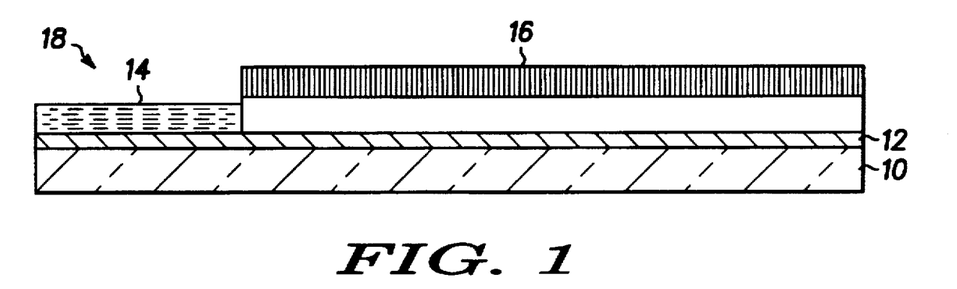
FIGS. 1-4 are simplified cross-sectional views of the required steps in a first disclosed method of fabricating a bi-stable non-pixellated liquid crystal phase spatial light modulator utilizing a chemically-induced or mechanically-induced alignment process according to the present invention.

A first step in the fabrication process of bi-stable non-pixellated liquid crystal phase spatial light modulator 30 includes the application of a first shadow mask to each of ITO coated substrate 10 elements. As illustrated in FIG. 1, a shadow mask 16 is placed on top of ITO coated substrate 10. Molecular alignment layer 14 is then fabricated typically with a silicon oxide (SiO) alignment layer or with a polymer alignment material, utilizing evaporative techniques, in a specific area 18 that is exposed.

Figure 2:
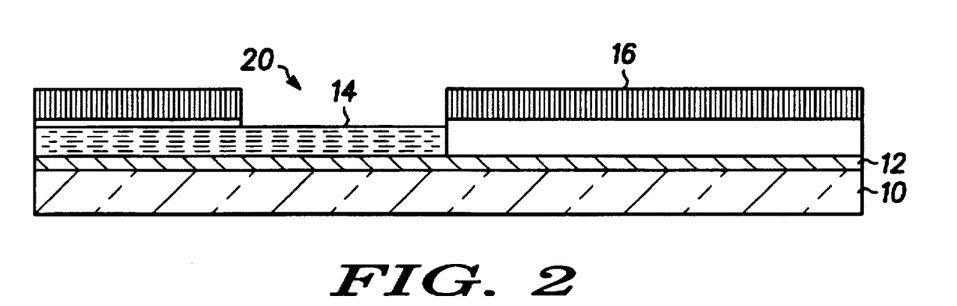
Figure 3:
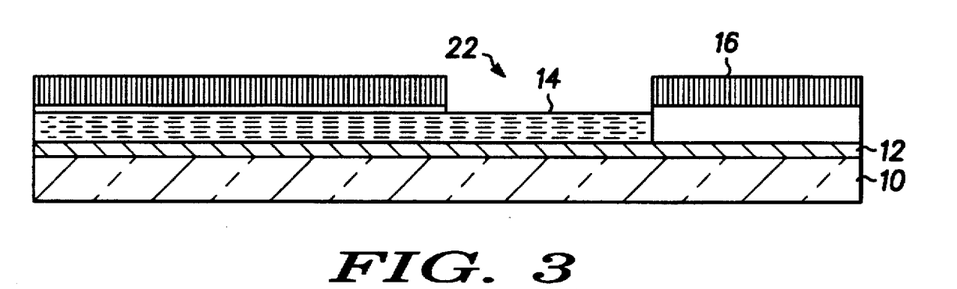
Figure 4:
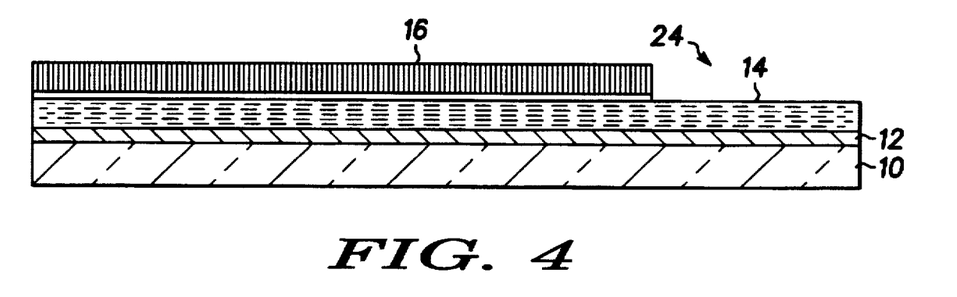

As illustrated in FIG. 1, shadow mask 16 permits recorded alignment in area 18 of alignment layer 14. This step in fabrication is repeated, as illustrated in FIGS. 2–4 until the desired number of phase changes are achieved, in an additional plurality of areas 20, 22, and 24 in this specific embodiment for each substrate 10 element. It should be understood that each specific area 18, 20, 22, and 24 is coated with a chemical composition, such as SiO, that varies in pre-tilt evaporation angles across the cell, or alternatively coated with varying polymer materials across the cell, thereby recording varying phase modulation information through a chemically-induced or mechanically-induced molecular alignment technique. Once this step in the fabrication process is complete for the two polymer coated substrates 10 which compose the bi-stable non-pixellated liquid crystal phase spatial light modulator device 30, they are aligned, filled with a continuous layer of nematic liquid crystal material composed of a plurality of liquid crystal molecules 26 and interfaced with a bi-stable drive circuit 28, thereby forming the bi-stable non-pixellated liquid crystal phase spatial light modulator, or scanner, 30. Drive circuit 28 is capable of delivering at least two discrete voltages across the device so as to provide for operation in one of an ON or OFF mode dependent upon the desired modulation of light passing therethrough. Once filled, the recorded information in the alignment layer 14 serves to align the liquid crystal molecules 26 contained within that specific area in a specific direction.

Figure 5:
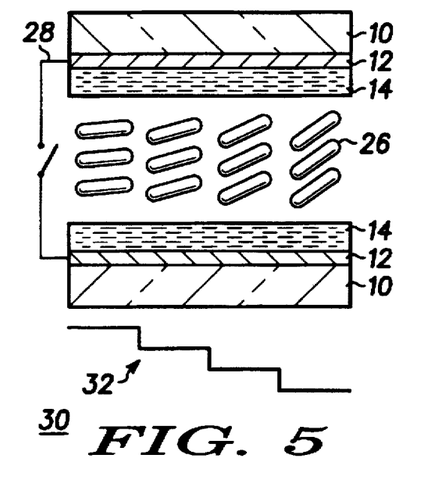
FIGS. 5 and 6 are simplified cross-sectional views of the structure of a bi-stable non-pixellated liquid crystal phase spatial light modulator of FIGS. 1-4, absent the presence of an electric field and under the influence of an electric field, respectively, according to the present invention.
Figure 6:
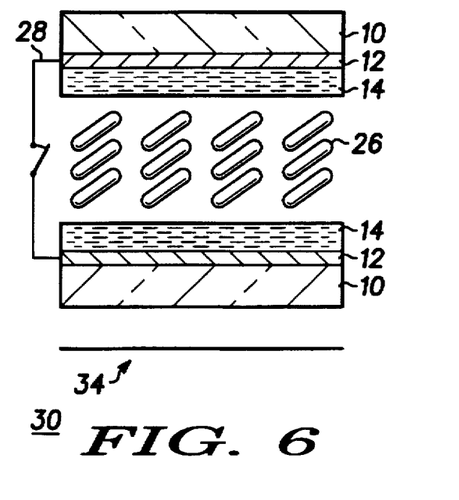
Figure 7:
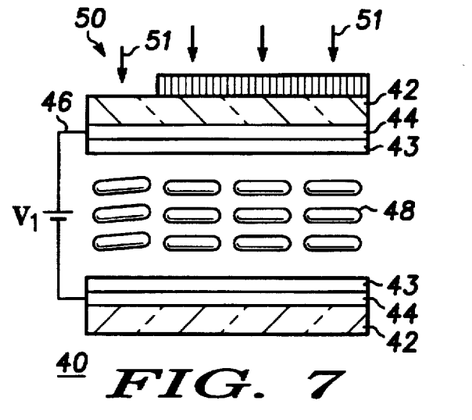
FIGS. 7-10 are simplified cross-sectional views of the required steps in a second disclosed method of fabricating a bi-stable non-pixellated liquid crystal phase spatial light modulator utilizing a doped liquid crystal according to the present invention.
Figure 8:
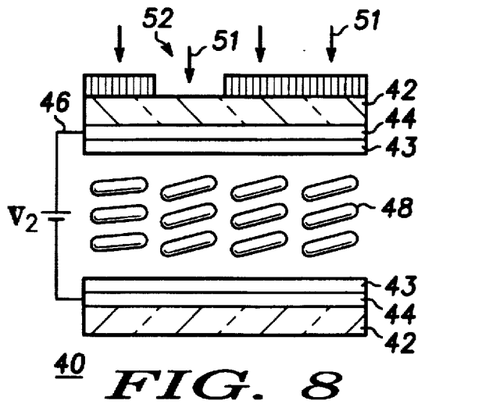
Figure 9:
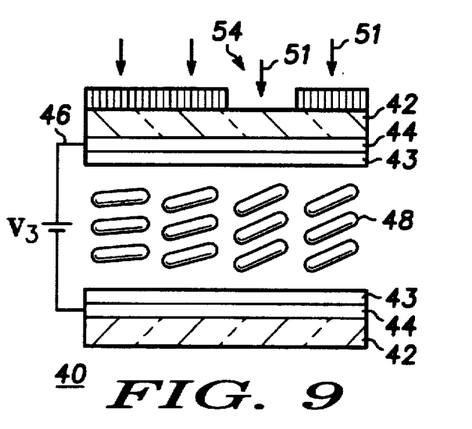
Figure 10:
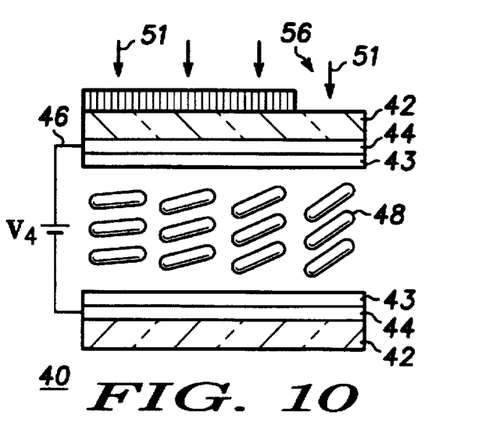

Referring now to FIG. 5, during operation, light passing through bi-stable non-pixellated liquid crystal phase spatial light modulator, or liquid crystal scanner, 30 undergoes a phase modulation dependent upon the information recorded in alignment layer 14. Illustrated schematically as a portion of FIG. 5, is a stair-stepped linear phase diagram 32, illustrating the resultant phase modulation of the light passing through liquid crystal scanner 30 in response to recorded alignment of liquid crystal molecules 26. Illustrated schematically as a portion of FIG. 6, is a flat-line linear phase diagram 34, illustrating the passage of light straight through device 30 when under the influence of an external stimulus, or electrical field.

It should be understood that liquid crystal scanner 30 is illustrated as being composed of optically transparent material, for use when scanning in a transmissive mode. The use of optically transparent material allows for the positioning of transmissive liquid crystal scanner 30 within a visual display system, allowing for the passage of light, emitted by the light emitting display device, to pass directly through device 30. An alternative embodiment would allow scanner 30 to act as a reflective scanner (not shown) whereby scanner 30 includes reflective properties allowing for light entering device 30 to undergo a first phase modulation and upon exiting back through device 30 in response to the reflective properties, undergoing a second phase modulation.

As an example of the specific fabrication of device 30, during the fabrication process a tubular glass spacer (not shown) is fixedly attached between opposed surfaces of the alignment layers 14 of the two substrate 10 elements by any convenient means, such as adhesive, chemical bonding, growing and etching layers, etc. It will of course be understood that the tubular glass spacer could be formed in a variety of other embodiments and the present structure is given for purposes of this explanation. The tubular glass spacer has an inner opening defined therethrough, of sufficient size to allow for the encapsulation of the liquid crystal material, more specifically molecules 26. Typical examples of liquid crystal material which can be used for this purpose are disclosed in U.S. Pat. No. 4,695,650, entitled "Liquid Crystal Compounds and Compositions Containing Same", issued Sep. 22, 1987.

The electrically conductive material layers 12 of device 30 form a first and second electrical contact and are connected and/or adapted to have applied thereto a common potential, such as ground or some fixed voltage, which serves to apply a voltage to scanner 30. Scanner 30 operates in either an "ON" or "OFF" mode dependent upon the presence or absence of the voltage. To activate the reorientation of the recorded molecular structure of the liquid crystal material, more specifically molecules 26, the potential, or voltage, must be applied between the upper and lower contacts. With no potential applied, the liquid crystal material, or molecules 26, are normally in their recorded orientation. With a strong potential applied, molecules 26 are altered so as to align along the same direction, and any light passing therethrough would not undergo a spatially varying phase modulation.

Referring now to FIGS. 7–12, illustrated are similar partial cross-sectional views of a transmissive bi-stable non-pixellated liquid crystal phase spatial light modulator according to a second method of fabrication disclosed in the present invention. Transmissive liquid crystal scanner 40 is similar to the transmissive liquid crystal scanner 30 previously described, except that in this embodiment, information, or more specifically the molecular alignment of the liquid crystal material contained in scanner 40 is fabricated using a photo-chemical reaction to achieve optical storage of information in a doped liquid crystal.

Referring now to FIGS. 7–10, illustrated are the various steps in the fabrication of scanner 40. Device 40 is fabricated similar to scanner 30 previously described, as illustrated in simplified and enlarged partial sectional views. More specifically, transmissive liquid crystal device 40 is generally fabricated in a stack formation including two substrates 42 formed of any convenient optically transparent material, such as glass. A conductive material layer 44 is formed on a surface of each substrate 42. Electrically conductive material layer 44 is fabricated of an optically transparent material, such as indium tin oxide (ITO), thereby allowing the light impinging thereon to pass therethrough and defining optically clear contacts. Scanner 40 includes a photopolymer molecular alignment, or orientation, layer 43 to properly position and align the molecules comprising the liquid crystal material. Liquid crystal scanner 40 utilizes a continuous layer of doped liquid crystal material to achieve recorded liquid crystal alignment, more specifically molecular orientation of the liquid crystal material, whereby the liquid crystal molecules are oriented in a specific direction when there does not exist any external stimulus, such as a voltage, acting upon the liquid crystal device 40.

A first step in the fabrication process of bi-stable non-pixellated liquid crystal phase spatial light modulator 40 includes the stacked formation of substrates 42, so as to create a biased voltage between the two conductive layers 44. Liquid crystal scanner 40 is filled with a doped liquid crystal monomer. Once the plurality of elements are aligned in a stacked formation, they are interfaced with drive circuitry 46 capable of applying an external stimulus thereto. Next, masking is performed so as to allow one specific area 50, 52, 54 or 56 to undergo molecular alignment. More specifically a first voltage, $V_1$, is applied to device 40 so as to align liquid crystal monomer molecules 48 in a certain direction. The liquid crystal monomer molecules 48 are then polymerized in their aligned state by light 51, so as to align those molecules within area 50. The resulting polymer film preserves the optical aligned state without the influence of an electric field. This step is repeated for each specific area 52, 54, and 56 utilizes varying voltages, illustrated as $V_2$, $V_3$, and $V_4$, until the desired number of phase modulations are achieved.

Figure 11:
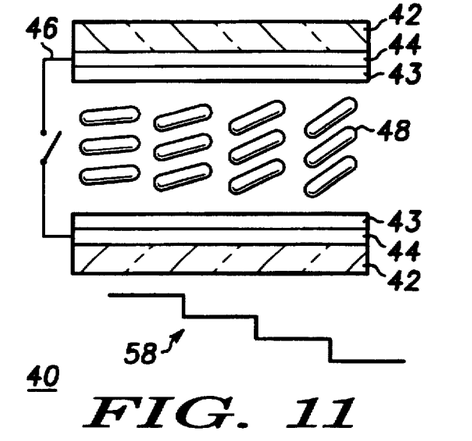
FIGS. 11 and 12 are simplified cross-sectional views of the structure of the bi-stable non-pixellated liquid crystal phase spatial light modulator of FIGS. 7-10 absent the presence of an electric field and under the influence of an electric field, respectively, according to the present invention.
Figure 12:
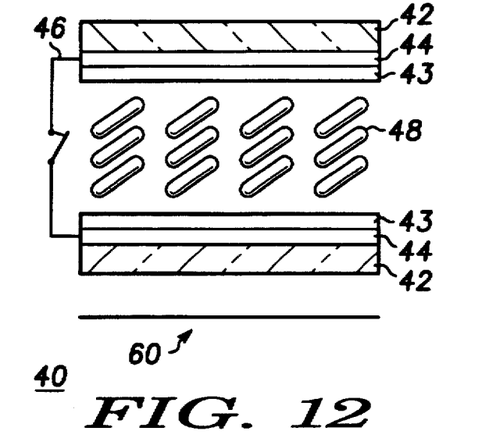

Referring now to FIGS. 11 and 12, during operation, light passing through bi-stable non-pixellated liquid crystal phase spatial light modulator, or liquid crystal scanner, 40 undergoes a phase modulation dependent upon the information recorded in liquid crystal monomer molecules 48, more specifically as a result of the alignment of the molecules 48. Illustrated schematically as a portion of FIG. 11, is a stair-stepped linear phase diagram 58, illustrating the resultant phase modulation of the light passing through liquid crystal scanner 40 in response to recorded alignment of liquid crystal molecules 48. Illustrated schematically as a portion of FIG. 12, is a flat-line linear phase diagram 60, illustrating the passage of light straight through device 40 when under the influence of an external stimulus, or electrical field. Device 40 operates based on the polymer film losing the alignment information when under the influence of a strong electric field, thus molecules 48 tilting to a position to allow passage of light therethrough without undergoing a phase modulation. As a result, stored phase information can be turned off and on resulting in a bi-stable scanner.

It should be understood that liquid crystal scanner 40 is illustrated as being composed of optically transparent material, for use when scanning in a transmissive mode. The use of optically transparent material allows for the positioning of transmissive liquid crystal scanner 40 within a visual display system, allowing for the passage of light, emitted by the light emitting display device, to pass directly through device 40. An alternative embodiment would allow scanner 40 to act as a reflective scanner (not shown) whereby scanner 40 includes reflective properties allowing for light entering device 40 to undergo a first phase modulation and upon exiting back through device 40 in response to the reflective properties, undergoing a second phase modulation.

Figure 13:
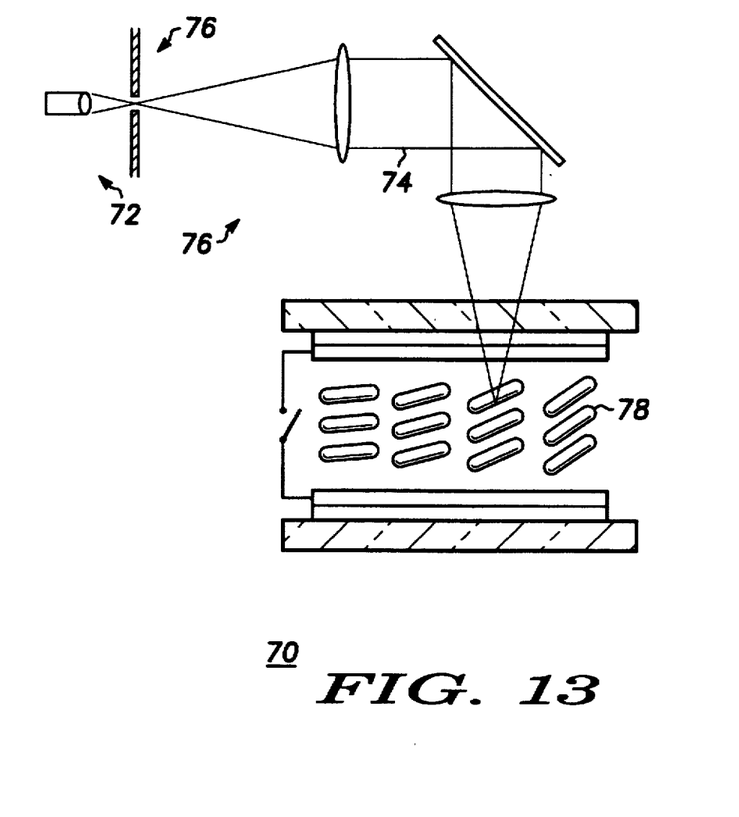
FIG. 13 is a simplified cross-sectional view of the structure of a bi-stable non-pixellated liquid crystal phase spatial light modulator according to the present invention, formed using laser beam fabrication techniques.

Referring now to FIG. 13, disclosed is an alternative method of fabrication and the resultant bi-stable non-pixellated liquid crystal device according to the present invention. More specifically, disclosed is the fabrication of a bi-stable non-pixellated liquid crystal scanner device 70 utilizing laser writing techniques to store phase information within a plurality of molecules 78 of scanner device 70. The scanner is fabricated according to the previously disclosed method in which molecular alignment information is recorded utilizing a photo-chemical reaction, thereby providing for optical storage within a doped liquid crystal. A laser writing device 72 is utilized in lieu of a more common light source, such as one capable of emitting ultraviolet light, thereby polymerizing the doped liquid crystal monomer. A laser emission 74 is typically steered by an optical system 76, typically composed of a plurality of optical elements, more specifically, reflective elements, spatial filters, lenses, or the like, toward device 70, thereby causing the photo-chemical reaction of a doped liquid crystal in an area charged by the laser. It should be understood that fabrication of device 70 utilizing a laser induced photo-chemical changes does not require the masking off of areas, due to the high degree of control of laser emission 74.

Irrespective of the specific method of fabrication of the bi-stable non-pixellated liquid crystal phase spatial light modulator of the present invention, one-dimensional and two-dimensional beam steering can be accomplished. To accomplish one-dimensional beam steering, two liquid crystal scanners, are required to be stacked one on top of another, and a one-dimensional or two-dimensional light emitting device is utilized as the image source. The light passing through the first scanner would undergo a phase variation in the x-direction, controlled by the absence or presence of an applied voltage and is spatially modulated to increase display resolution in the resultant integrated image. The resultant integrated image is viewable by the observer as a two-dimensional image.

To accomplish two-dimensional beam steering two pairs of liquid crystal scanners, each pair generally similar to the scanners of the present invention, more specifically four individual liquid crystal cells, are aligned and stacked so that the extraordinary optical axes ($N_e$) of the four cells are positioned orthogonal to each other. An image source, capable of emitting light through the four aligned liquid crystal cells is positioned along the optical axis of the scanner. Accordingly, the light entering the scanner cells undergoes a variation in phase in both the x-direction and the y-direction and can be spatially modulated to increase display resolution in the resultant integrated image. The resultant integrated image is viewable by the observer as a two-dimensional image.

It should be understood that this disclosure is not limited to scanning devices, and can apply to programmable focus/defocus lenses. The material of the scanning device is not limited to the use of nematic liquid crystal as disclosed in the preferred embodiment, and other types of liquid crystal materials, as well as bi-stable scanners utilizing other phase modulating materials are anticipated by this disclosure. It should be understood that this concept of beam steering can be utilized in all beam steerers relying on birefringence effect steering, such as PLZT steerers, or the like.

Thus, disclosed is a new and improved bi-stable non-pixellated liquid crystal phase spatial light modulator having phase modulation information, more specifically molecular alignment of liquid crystal molecules, recorded therein. The scanner device of the present invention is fabricated based on recording (storing) molecular alignment as a result of a mechanically-induced change in the molecular alignment layer, variation in the polymer material which compose the alignment layer, or a photo-chemical reaction of a doped liquid crystal thereby providing for data output storage. The scanner device of the present invention operates by modulating the phase of light passing therethrough when drive circuitry is absent the influence of an electric field, or by altering the molecular alignment so as to allow the passage of light therethrough without undergoing a phase modulation when the scanner is under the influence of an electric field. The liquid crystal scanner of the present invention is meant to be incorporated into a visual display system, more specifically an electro-optical system, additionally composed of a light emitting display device which serves as an image source, driver/control circuitry and optical elements (discussed presently). During operation, the scanner of the present invention serves to shift the pixels of the individual array, groups of pixels of the array, or alternatively serves to shift the entire array, thereby creating enhanced resolution through phase modulation. Further information regarding the shifting of pixels, pixel groups, and arrays can be found in U.S. patent application entitled "VISUAL DISPLAY SYSTEM FOR DISPLAY RESOLUTION ENHANCEMENT", Ser. No. 08/638,709, filed Apr. 29, 1996, assigned to the same assignee and incorporated herein by this reference.

The visual display system includes various additional optical components while conveniently integrating electrical connections to the components and providing external connections thereto. Light sources, polarizers, diffusers and optics are conveniently integrated into the system which is easily integrated into portable electronic equipment. It is further disclosed that additional optical elements, such as polarizer plates or layers, refractive elements, diffractive elements, etc. may be easily positioned exterior the visual display system.

It should be understood that the resultant integrated image generated by the visual display system, composed of the image source, or light emitting display device, the phase spatial light modulator, driver/control circuits and various optical elements, is too small to properly perceive (fully understand) with the human eye and generally requires a magnification of at least 10× for comfortable and complete viewing. Accordingly, a visual display system of the present invention is typically formed within a housing, defining an optical magnifier, having integrally formed therein an optical magnification system. The optical magnifier is generally defined by a plurality of sides which compose the housing. Several examples of optical magnifiers with optical magnification systems which may have incorporated therein the liquid crystal scanner 30 or 40 of the present invention are illustrated in FIGS. 14 through 15, explained below.

Figure 14:
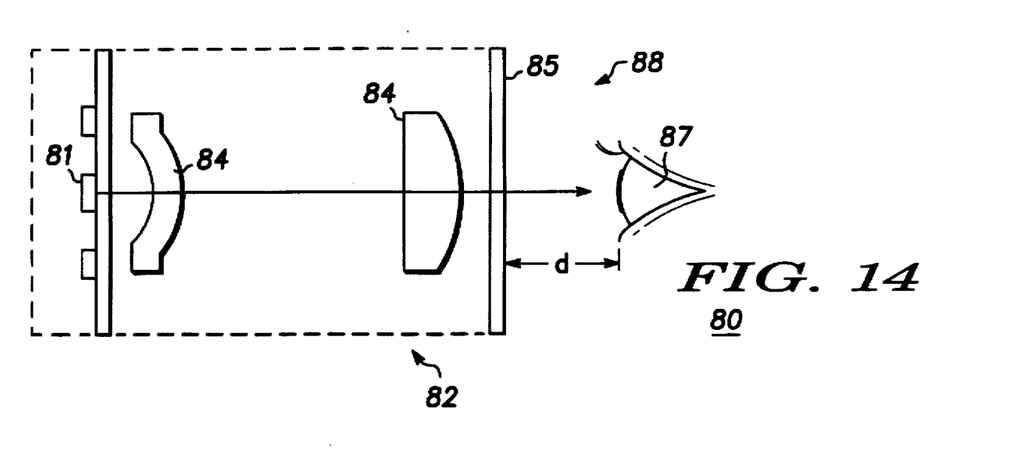
FIG. 14 is a simplified schematic view of a miniature visual image display incorporating the transmissive nematic liquid crystal scanner of the present invention.
Figure 15:
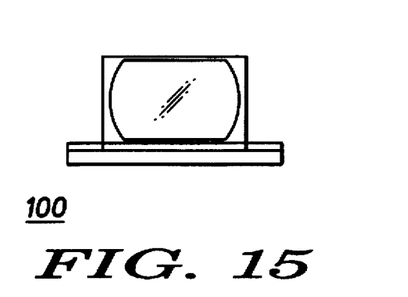
FIGS. 15, 16 and 17 illustrate a front view, side elevational view, and a top plan, respectively, of an image manifestation apparatus utilizing the nematic liquid crystal scanner of the present invention.

Referring to FIG. 14, a miniature visual image display 80 is illustrated in a simplified schematic view. Miniature visual image display 80 is defined by housing 82 and includes an image generation apparatus 81 for providing an image. An optical system, represented by optical elements 84, is positioned in spaced relation to image generation apparatus 81 of miniature visual image display 80. A transmissive phase spatial light modulator 85, generally similar to liquid crystal scanner 30, 40 or 70, previously described, is positioned to allow the light emitted by image generation apparatus 81 to pass therethrough and produce an image viewable by an eye 87 spaced from an aperture 88.

In operation, the light generated by image generation apparatus 81 passes through optical elements 84 and scanner 85. "ON/OFF" external voltages are applied to scanner 85, thereby resulting in a scanning effect of the light emitted by a plurality light emitting devices of image generation apparatus 81. The resultant integrated image viewable by the eye 87 of the observer through aperture 88 appears to have a greater number of pixels and an increased aperture ratio, even though the number of pixels of the image generation apparatus 81 remains the same.

Optical elements 84, represented schematically by a plurality of optical elements mounted in spaced relation from image generation apparatus 81, receive the image from image generation apparatus 81 and magnify it an additional predetermined amount. It will of course be understood that the magnification and/or correction can be provided by any number or type of optical element and may be adjustable for focus and additional magnification, if desired, or may be fixed in a separate housing for simplicity. It should be noted that additional optical elements can be provided exterior the miniature visual image display 80 for further image magnification and/or correction.

Eye relief is the distance that eye 87 can be positioned from viewing aperture 88 and still properly view the image, which distance is denoted by "d" in FIG. 14. Because of the size of lens system 83, eye relief, or the distance d, is sufficient to provide comfortable viewing and in the present embodiment is great enough to allow a viewer to wear normal eyeglasses, if desired.

Figure 16:
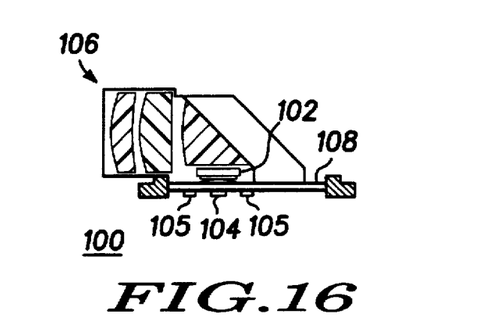
Figure 17:
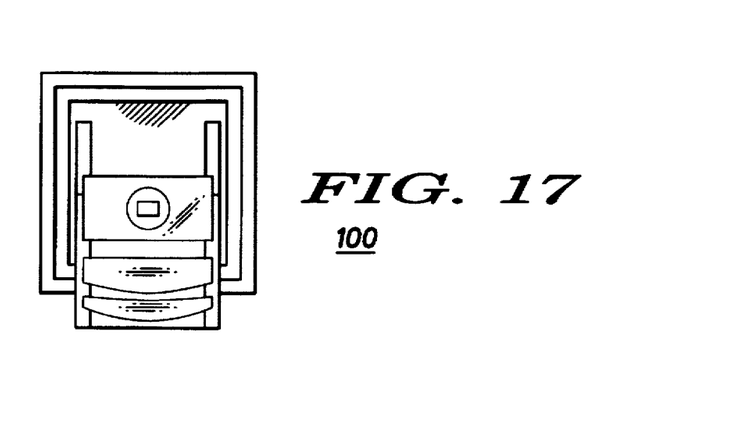

Referring now to FIGS. 15, 16 and 17, another miniature visual image display 100, in accordance with the present invention, is illustrated in a front view, side elevational view, and top plan, respectively. FIGS. 15, 16 and 17 illustrate miniature visual image display 100 approximately the actual size to provide an indication as to the extent of the reduction in size achieved by the present invention. Miniature visual image display 100 includes a transmissive bi-stable non-pixellated liquid crystal phase spatial light modulator 102, hereinafter referred to as liquid crystal scanner 102, (generally similar to liquid crystal scanner 30 40 or 70, described above), an image generation apparatus 104, a plurality of driver/control circuits 105, and a plurality of optical elements, which comprise an optical magnification system 106. Image generation apparatus 104 is mounted in electrical interface with a standard printed circuit board 108. Liquid crystal phase spatial light modulator 102 is mounted to optical magnification system 106, thereby allowing the light emitted by image generation apparatus 104 to pass through liquid crystal scanner 102 and exit the folded optical magnifier formed by optical magnification system 106. It should be understood that scanner 102 can alternatively be mounted elsewhere within display 100.

Figure 18:
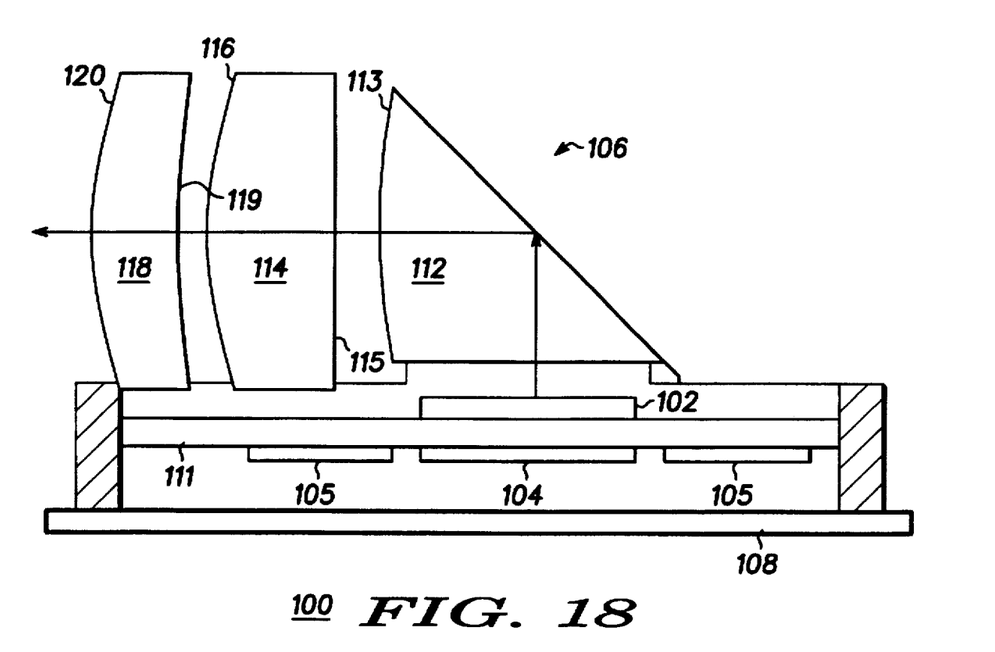
FIG. 18 is a 4× magnified view in side elevation of the apparatus of FIG. 15 utilizing the transmissive nematic liquid crystal scanner of the present invention.

FIG. 18, illustrates a 4× magnified view in side elevation of the miniature visual image display of FIG. 15, referenced here as 100, utilizing the transmissive liquid crystal phase spatial light modulator of the present invention. From this view it can be seen that a transmissive liquid crystal scanner 102 (generally similar to transmissive liquid crystal scanner 30, 40 or 70 above) is affixed directly to the upper surface of a mounting substrate 111 to which an image generation apparatus 104 is mounted. An optical prism 112 is mounted to reflect the image generated by transmissive liquid crystal scanner 102 through a refractive surface 113. The image is then directed to an optical lens 114 having a refractive inlet surface 115 and a refractive outlet surface 116. From optical lens 114 the image is directed to an optical lens 118 having an inlet refractive surface 119 and an outlet refractive surface 120. Also, in this embodiment at least one diffractive optical element is provided on one of the surfaces, e.g. surface 113 and/or refractive inlet surface 115, to correct for chromatic and other aberrations. The operator looks into outlet refractive surface 120 of optical lens 118 and sees a large, easily discernible visual image which appears to be behind miniature visual image display 100.

It is anticipated by this disclosure that the plurality of optical elements disclosed in FIGS. 14–18, include reflective elements, refractive elements, diffractive elements, polarizers, diffusers, or holographic lenses that may be mounted in overlying relationship to the image generation apparatus, specifically positioned on an interior aspect of the optical magnifiers It is further disclosed that a plurality of optical elements, including reflective elements, refractive elements, diffractive elements or diffusers may be mounted in overlying relationship to the surface of the optical magnifier through which the light, or resultant integrated image, is output, specifically positioned on an exterior aspect of a light output surface, to form an image plane for the light which forms the resultant integrated image.

Liquid crystal phase spatial light modulator 30, 40 and 70 of the present invention are meant to be incorporated into any number of varying visual image display systems, some of which have been previously described herein. These types of visual image display systems are ultimately intended for use in various types of electronic equipment, namely portable communications equipment, such as cellular and portable telephones, as well as smart-card reader devices, or the like.

Thus, a new and improved liquid crystal phase spatial light modulator composed of a liquid crystal cell which serves to spatially modulate the phase of light emitted by a light emitting display device is disclosed which is relatively easy and inexpensive to manufacture. The liquid crystal phase spatial light modulator of the present invention is intended for use in miniature visual display systems. The visual display system components ruggedly mount an image source, various optical components and the liquid crystal phase spatial light modulator scanning device, while conveniently integrating electrical connections to the components and providing external connections thereto. Light sources, polarizers, diffusers and, if desired, additional optics are conveniently integrated into the small visual display system which is easily integrated into a housing, forming an optical magnifier, for use in portable electronic equipment. It is further disclosed that additional optical elements, such as polarizer plates or layers, refractive elements, diffractive elements, etc. may be easily positioned exterior the housing. By using light emitting devices for the light source, with low fill factors, which are scanned by the liquid crystal phase spatial light modulator to generate a resultant integrated image, characterized by high resolution, the size of the system is further reduced and the electrical power required is also minimized.

While we have shown and described specific embodiments of the present invention, further modifications and improvement will occur to those skilled in the art. We desire it to be understood, therefore, that this invention is not limited to the particular forms shown and we intend in the appended claims to cover all modifications that do not depart from the spirit and scope of this invention.

What is claimed is:

1. A method of fabricating a liquid crystal phase spatial light modulator comprising the steps of:

providing a liquid crystal cell composed of two substrate elements each having formed thereon a layer of conductive material, thereby providing for a first and second electrical contact and having positioned therebetween the first and second electrical contact a continuous layer of liquid crystal material;

providing a drive circuit capable of exerting a plurality of voltages across the liquid crystal cell;

exposing the liquid crystal cell to a first voltage and light, thereby providing for uniform background alignment of the liquid crystal material;

masking a first area of the liquid crystal cell, exposing the liquid crystal cell to a second voltage and exposing the first area to light, thereby providing for recorded molecular orientation within the liquid crystal material contained in the first area; and repeating the steps of masking, exposing to a second voltage and exposing to light an additional plurality of areas of the liquid crystal cell, thereby providing for recorded molecular orientation within each of the plurality of areas of the liquid crystal cell dependent upon a desired number of phase modulations.

2. A method of fabricating a liquid crystal phase spatial light modulator as claimed in claim 1 wherein the liquid crystal material includes doped liquid crystal material.

3. A method of fabricating a liquid crystal phase spatial light modulator as claimed in claim 1 wherein the steps of exposing the first area and the additional plurality of areas of the liquid crystal cell to light include exposing to ultraviolet light.

4. A method of fabricating a liquid crystal phase spatial light modulator comprising the steps of:

providing a liquid crystal cell composed of two substrate elements each having formed thereon a layer of conductive material, thereby providing for a first and second electrical contact and having positioned therebetween the first and second electrical contact a continuous layer of liquid crystal material;

providing a drive circuit capable of exerting a plurality of voltages across the liquid crystal cell;

exposing a first area of the liquid crystal cell to a first voltage and a laser emission thereby providing for recorded molecular orientation within the liquid crystal material contained in the first area; and repeating the step of exposing to a first voltage and a laser emission an additional plurality of areas of the liquid crystal cell, thereby providing for recorded molecular orientation within each of the additional plurality of areas of the liquid crystal cell dependent upon a desired number of phase modulations.

5. A method of fabricating a liquid crystal phase spatial light modulator as claimed in claim 4 wherein the liquid crystal material includes doped liquid crystal material.

* * * * *